US012640543B2

(12) United States Patent
Eriksson et al.

(10) Patent No.: US 12,640,543 B2
(45) Date of Patent: May 26, 2026

(54) OFFSHORE SYSTEM COMPRISING A DYNAMIC SUBMARINE POWER CABLE

(71) Applicant: NKT HV Cables AB, Lyckeby (SE)

(72) Inventors: Erik Eriksson, Växjö (SE); Ola Thyrvin, Karlskrona (SE); Andreas Tyrberg, Lyckeby (SE); Joel Johnsson, Kalmar (SE)

(73) Assignee: NKT HV Cables AB, Lyckeby (SE)

( * ) Notice: Subject to any disclaimer, the term of this patent is extended or adjusted under 35 U.S.C. 154(b) by 232 days.

(21) Appl. No.: 18/346,366

(22) Filed: Jul. 3, 2023

(65) Prior Publication Data

US 2024/0014643 A1      Jan. 11, 2024

(30) Foreign Application Priority Data

Jul. 8, 2022    (EP) ..................................... 22183780

(51) Int. Cl.
*H02G 3/03* (2006.01)
*H02G 9/12* (2006.01)
(Continued)

(52) U.S. Cl.
CPC ................. *H02G 3/03* (2013.01); *H02G 9/12* (2013.01); *H02G 15/007* (2013.01);
(Continued)

(58) Field of Classification Search
CPC ..... F16L 1/20; F16L 1/235; E02B 2017/0095; B63B 2035/446; F03D 13/126;
(Continued)

(56) References Cited

U.S. PATENT DOCUMENTS

| | | | | |
|---|---|---|---|---|
| 5,909,007 A | * | 6/1999 | Nørholmen | E21B 17/017 |
| | | | | 174/136 |
| 6,009,907 A | * | 1/2000 | Secher | E21B 17/017 |
| | | | | 138/109 |

(Continued)

FOREIGN PATENT DOCUMENTS

| | | | | |
|---|---|---|---|---|
| AU | 2023227746 A1 | * | 8/2024 | F03D 13/256 |
| CN | 113217295 A | * | 8/2021 | B63B 21/50 |

(Continued)

OTHER PUBLICATIONS

Extended European Search Report; Application No. 22183780.0; Completed: Nov. 7, 2022; Mailed: Nov. 14, 2022; 12 Pages.

*Primary Examiner* — Frederick L Lagman
(74) *Attorney, Agent, or Firm* — Whitmyer IP Group LLC

(57) ABSTRACT

An offshore system including: a dynamic submarine power cable, a bend stiffener having a lower end and a top end, the bend stiffener having a central channel extending from the lower end to the top end, the central channel receiving the dynamic submarine power cable with a radial spacing between an inner surface of the central channel and an outer surface of the dynamic submarine power cable along the length of the dynamic submarine power cable arranged in the bend stiffener, the radial spacing forming a longitudinal water channel between the bend stiffener and the dynamic submarine power cable, and an offshore structure tube connected to the bend stiffener, wherein the offshore structure tube has an inner tube channel in fluid communication with the longitudinal water channel, and wherein A) the offshore structure tube has a through-opening extending from the inner tube channel through a wall of the offshore structure tube to enable water flowing from the lower end through the bend stiffener to exit the offshore structure tube via the through-opening to provide water cooling of the dynamic submarine power cable in the bend stiffener, or B)

(Continued)

the bend stiffener has a radial through-opening arranged within ¼ of a total axial length of the bend stiffener, defined by a distance between the lower end and the top end, from the top end to enable water flowing from the lower end through the bend stiffener to exit the bend stiffener via the radial through-opening to provide water cooling of the dynamic submarine power cable in the bend stiffener.

15 Claims, 1 Drawing Sheet

(51) Int. Cl.
| | |
|---|---|
| *H02G 15/007* | (2006.01) |
| *B63B 35/44* | (2006.01) |
| *E02B 17/00* | (2006.01) |
| *H01B 7/14* | (2006.01) |

(52) U.S. Cl.
CPC . *B63B 2035/446* (2013.01); *E02B 2017/0095* (2013.01); *H01B 7/14* (2013.01)

(58) Field of Classification Search
CPC ......... F03D 13/25; F03D 13/256; H02G 3/03; H02G 9/12; H02G 15/007
USPC ........................................... 405/168.1, 168.2
See application file for complete search history.

(56) References Cited

U.S. PATENT DOCUMENTS

| | | | |
|---|---|---|---|
| 6,225,553 B1 * | 5/2001 | Friis ..................... | H02G 15/007 361/677 |
| 8,210,775 B2 * | 7/2012 | Clevelario .............. | F16L 1/123 405/168.1 |
| 9,741,212 B2 * | 8/2017 | Worzyk ................ | H02G 15/007 |
| 11,374,388 B2 * | 6/2022 | Smith ..................... | H02G 1/10 |
| 2014/0212221 A1 * | 7/2014 | Routeau .............. | E21B 43/0107 29/505 |
| 2016/0265701 A1 * | 9/2016 | Greig ..................... | E21B 17/05 |
| 2018/0198264 A1 * | 7/2018 | Bang-Andreasen ..... | H02G 1/10 |
| 2018/0320502 A1 * | 11/2018 | Turner ................... | B63B 35/03 |
| 2024/0013950 A1 * | 1/2024 | Eriksson ................. | H02G 9/12 |

FOREIGN PATENT DOCUMENTS

| | | | | |
|---|---|---|---|---|
| EP | 3066730 A1 | | 9/2016 | |
| GB | 2411445 A | * | 8/2005 | .......... E21B 17/017 |
| GB | 2546066 A | * | 7/2017 | ............ F03D 80/85 |
| JP | 2016226194 A | | 12/2016 | |
| KR | 20130056385 A | * | 5/2013 | .............. H01B 9/02 |
| WO | 20120777 A1 | | 1/2014 | |
| WO | 2015150277 A1 | | 10/2015 | |

* cited by examiner

OFFSHORE SYSTEM COMPRISING A DYNAMIC SUBMARINE POWER CABLE

TECHNICAL FIELD

The present disclosure generally relates to offshore systems comprising a dynamic submarine power cable.

BACKGROUND

Power generating floating offshore structures such as floating wind turbines are connected to a dynamic submarine power cable to deliver power generated by the floating wind turbine to an electrical grid. Other types of floating offshore structures such as floating oil platforms may be connected to a dynamic submarine power cable for power consumption purposes.

Floating offshore structures are subjected to wave movement. Dynamic submarine power cables are therefore connected to the floating offshore structures via a bend stiffener to control the bending radius of the cable.

Power cables are designed to be able to be operated at a maximum operating temperature, which for example may be 90° C. according to international standards such as IEC 60287-1-1.

It has been found that the bend stiffener forms a cable hot spot along the cable route between the seabed and the floating offshore structure because of its low thermal conductivity. This hot spot is the hottest region of the dynamic submarine power cable. The maximum current allowed in the dynamic submarine power cable is thus determined by the temperature in the power cable as it extends through the bend stiffener.

SUMMARY

A general object of the present disclosure is to provide an offshore system which solves or at least mitigates problems of the prior art.

There is hence provided an offshore system comprising: a dynamic submarine power cable, a bend stiffener having a lower end and a top end, the bend stiffener having a central channel extending from the lower end to the top end, the central channel receiving the dynamic submarine power cable with a radial spacing between an inner surface of the central channel and an outer surface of the dynamic submarine power cable along the length of the dynamic submarine power cable arranged in the bend stiffener, the radial spacing forming a longitudinal water channel between the bend stiffener and the dynamic submarine power cable, and an offshore structure tube connected to the bend stiffener, wherein A) the offshore structure tube has an inner tube channel in fluid communication with the longitudinal water channel, and wherein the offshore structure tube has a through-opening extending from the inner tube channel through a wall of the offshore structure tube to enable water flowing from the lower end through the bend stiffener to exit the offshore structure tube via the through-opening to provide water cooling of the dynamic submarine power cable in the bend stiffener, or B) the bend stiffener has a radial through-opening arranged within ¼ of a total axial length of the bend stiffener, defined by a distance between the lower end and the top end, from the top end to enable water flowing from the lower end through the bend stiffener to exit the bend stiffener via the radial through-opening to provide water cooling of the dynamic submarine power cable in the bend stiffener.

Thus, the hot spot region of the dynamic submarine power cable is cooled by water. As a result, a higher current can be fed through the dynamic submarine power cable and/or the cross-section of the conductor(s) of the dynamic submarine power cable may be reduced during the design stage as a result of the cooler dynamic submarine power cable in the bend stiffener.

The radial through-opening may according to some examples be arranged within ⅕ or ¹⁄₁₀ of the total axial length of the bend stiffener, from the top end of the bend stiffener.

The hottest point of a dynamic submarine power cable in a non-cooled bend stiffener is typically around ⅔ of the total length of the bend stiffener as measured from the lower end. By arranging the radial through-opening within ¼, ⅕ or ¹⁄₁₀ of the total axial length of the bend stiffener measured from the top end, the hottest point will be cooled, and the heat distribution curve will be shifted towards the top end of the bend stiffener. Even a non-cooled top section of the dynamic submarine power cable in the bend stiffener will have a substantially lower temperature than if the dynamic submarine power cable would be completely non-cooled.

The water cooling may according to one example be by natural convection. This makes the cooling robust as no pump or similar device is required for the water cooling.

According to one example, the offshore system may comprise a pump configured to pump water up through the longitudinal water channel and through the through-opening of the offshore structure tube. Forced water cooling may thus be achieved.

The pump may for example be arranged outside the offshore structure tube.

The applicant has as an example analysed the improvement given by natural convection for a 3*1000 mm² 230 kV nominal voltage AC dynamic submarine power cable with an allowed maximum conductor temperature of 90° C. In a simulation, a current of 1050 A was fed through the dynamic submarine power cable. This resulted in a maximum conductor temperature of the cable inside the bend stiffener of about 140° C. when no natural convection was provided. When natural convection via the bend stiffener was included in the simulation, the maximum conductor temperature only reached 70° C., i.e., the temperature was reduced with about 50%.

According to one embodiment the offshore structure tube is an I-tube.

According to one embodiment the bend stiffener is a submerged bend stiffener. The bend stiffener may thus be arranged underwater.

According to one embodiment the through-opening or radial through-opening is arranged underwater. The through-opening or radial through-opening is thus submerged underwater.

According to one embodiment the dynamic submarine power cable is a high voltage power cable rated for a voltage of at least 33 kV.

The dynamic submarine power cable may according to some examples be rated for a voltage of at least 132 kV such as at least 220 kV.

According to one embodiment the offshore structure tube is arranged vertically above the bend stiffener.

According to one embodiment the dynamic submarine power cable extends inside the inner tube channel of the offshore structure tube.

One embodiment comprises an offshore floating structure, wherein the offshore structure tube forms part of the offshore floating structure.

According to one embodiment the offshore floating structure is one of a floating wind turbine, a floating substation, a floating hydrocarbon platform or a floating hydrocarbon vessel.

There is according to a second aspect provided a method of cooling a dynamic submarine power cable of an offshore system comprising: the dynamic submarine power cable, a bend stiffener having a lower end and a top end, the bend stiffener having a central channel extending from the lower end to the top end, the central channel receiving the dynamic submarine power cable with a radial spacing between an inner surface of the central channel and an outer surface of the dynamic submarine power cable along the length of the dynamic submarine power cable arranged in the bend stiffener, the radial spacing forming a longitudinal water channel between the bend stiffener and the dynamic submarine power cable, and an offshore structure tube connected to the bend stiffener, wherein the offshore structure tube has an inner tube channel in fluid communication with the longitudinal water channel, and wherein the offshore structure tube has a through-opening extending from the inner tube channel through a wall of the offshore structure tube to enable water flowing from the lower end through the bend stiffener to exit the offshore structure tube via the through-opening to provide water cooling of the dynamic submarine power cable in the bend stiffener, or wherein the bend stiffener has a radial through-opening arranged within ¼, ⅕ or 1/10 of a total axial length of the bend stiffener, defined by a distance between the lower end and the top end, from the top end to enable water flowing from the lower end through the bend stiffener to exit the bend stiffener via the radial through-opening to provide water cooling of the dynamic submarine power cable in the bend stiffener, the method comprising: providing the bend stiffener such that the lower end is submerged in seawater, causing seawater to enter the longitudinal water channel.

According to one embodiment, the seawater flows along the longitudinal water channel and exits the through-opening or radial through-opening by natural convection.

According to one embodiment the through-opening or radial through-opening is arranged underwater.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

Figures 1, 2, 3:
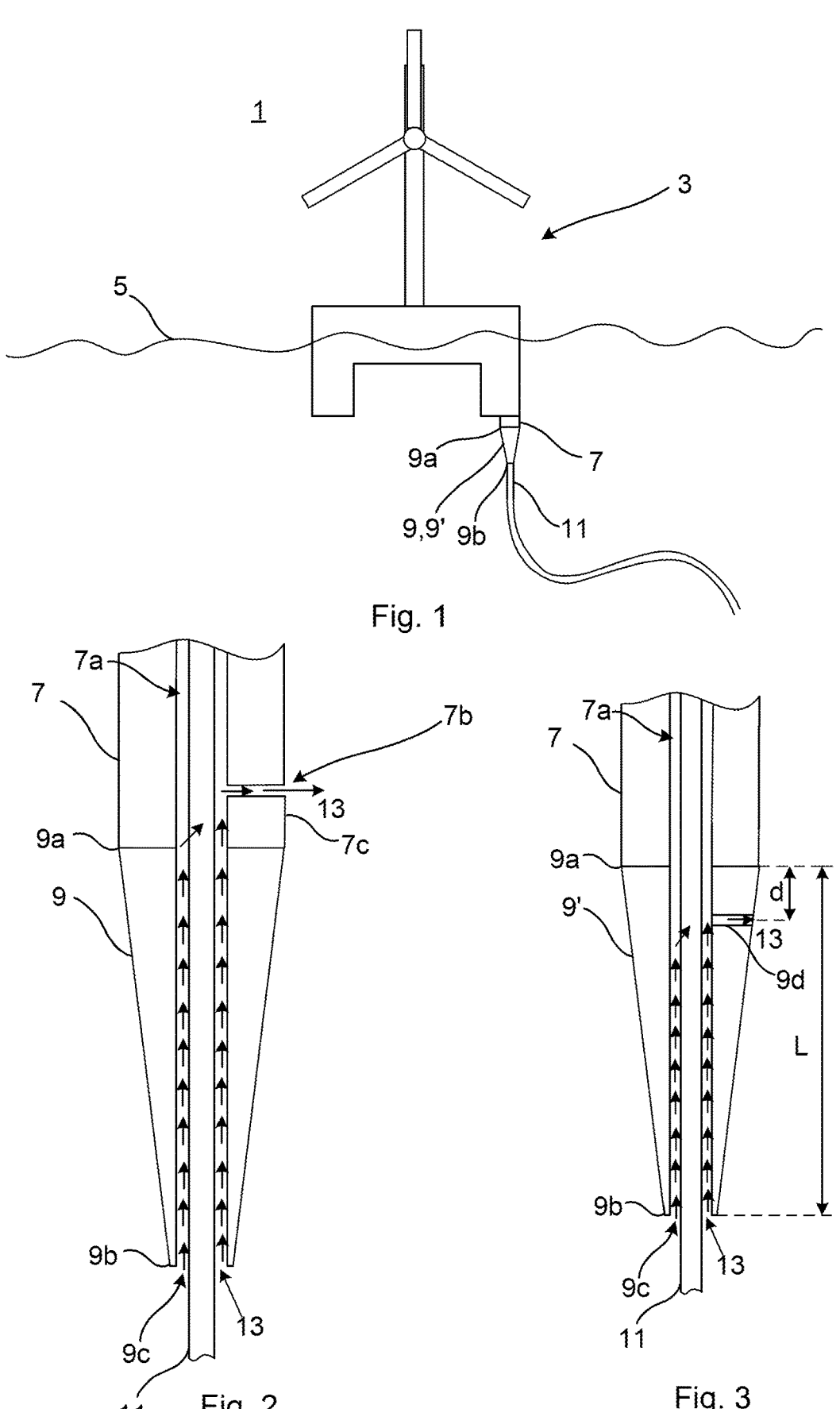
FIG. 1. schematically shows an offshore system.
FIG. 2 schematically shows a close-up cross-sectional view of a portion of one realization of the offshore system in FIG. 1.
FIG. 3 schematically shows a close-up cross-sectional view of a portion of another realization of the offshore system in FIG. 1.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

FIG. 1 shows an example of an offshore system 1. The offshore system 1 comprises an offshore floating structure 3.

The offshore system 1 is deployed in water 5 such as sea water. In particular, the offshore floating structure 3 is deployed in water 5 and floats on the water surface.

In the present example, the offshore floating structure 3 is a floating wind turbine but could alternatively for example be a floating substation, a floating hydrocarbon platform, a floating hydrocarbon vessel, a semi-submersible platform, or any other offshore floating structure which generates electric power or consumes electrical power.

The offshore floating structure 3 comprises an offshore structure tube 7. The offshore structure tube 7 may be made of metal, such as steel. The offshore structure tube 7 extends vertically or essentially vertically downwards in a direction towards the seabed.

The offshore structure tube 7 may be an I-tube.

The offshore system 1 comprises a bend stiffener 9. The bend stiffener 9 has a top end 9a and a lower end 9b. The bend stiffener 9 tapers in a direction from the top end 9a towards the lower end 9b.

The bend stiffener 9 has a central channel extending from the top end 9a to the lower end 9b. The central channel extends along a longitudinal axis of the bend stiffener 9.

The bend stiffener 9 is connected to the offshore structure tube 7. The top end 9a of the bend stiffener 9 is connected to a lower portion of the offshore structure tube 7. The offshore structure tube 7 is arranged vertically or essentially vertically above the bend stiffener 9.

The offshore system 1 comprises a dynamic submarine power cable 11.

The dynamic submarine power cable 11 may be a single phase or multi-phase AC power cable or a single pole or multi-pole DC power cable.

The dynamic submarine power cable 11 may be a high voltage AC or DC power cable.

The dynamic submarine power cable 11 comprises a conductor and an insulation system arranged around the conductor. The insulation system comprises an inner semiconducting layer, an insulation layer arranged outside the inner semiconducting layer, and an outer semiconducting layer arranged outside the insulation layer.

The dynamic submarine power cable 11 comprises a metallic water barrier arranged concentrically with the conductor, outside the insulation system. The metallic water barrier may be corrugated or smooth. The metallic water barrier may comprise lead or be lead-free. If lead-free, the metallic water barrier may for example comprising copper, aluminium, or stainless steel. Alternatively, the dynamic submarine power cable 11 could have a wet design, i.e., be without a metallic water barrier.

The dynamic submarine power cable 11 comprises a polymer sheath arranged outside the metallic water barrier.

The dynamic submarine power cable 11 may comprise one or more armour layers arranged around the polymer sheath. The armour layer(s) may comprise metal wires or ropes, for example made of galvanized steel or austenitic stainless steel, synthetic wires such as jacketed aramid fibres, or a combination of both.

The dynamic submarine power cable 11 may have an outer serving arranged outside the one or more armour layers.

In cases where the dynamic submarine power cable 11 comprises more than one electric phase or pole, the dynamic submarine power cable 11 comprises more than one conductor, each with the corresponding structure as described above arranged around it, i.e., insulation system, metallic water barrier, and polymer sheath. Each such structure forms a power core. The armour layer(s) is/are arranged around all of the power cores.

The dynamic submarine power cable 11 extends through the entire bend stiffener 9 in the central channel of the bend stiffener 9.

The dynamic submarine power cable 11 extends from the offshore floating structure 3 to the seabed.

The dynamic submarine power cable 11 extends through the offshore structure tube 7 and is anchored to the offshore floating structure 3. The dynamic submarine power cable 11 may be anchored to the offshore floating structure 3 by means of a hang-off device.

The dynamic submarine power cable 11 is terminated on the offshore floating structure 3.

The dynamic submarine power cable 11 may be cooled by natural convection of water inside the bend stiffener 9, as will be explained in more detail in the following, or by forced cooling.

FIG. 2 shows a close-up view of one realization of the offshore system 1 in a region of the bend stiffener 9 which is immersed in water.

The central channel 9c of the bend stiffener has an inner surface which is arranged radially spaced apart from the outer surface of the dynamic submarine power cable 11 along the entire length of the dynamic submarine power cable 11 extending through the bend stiffener 9. There is thus a radial spacing between the dynamic submarine power cable 11 and the central channel 9c. The inner surface of the central channel 9c may for example comprise radially inwards extending structures such as ribs extending along a longitudinal direction of the bend stiffener 9. The radially inwards extending structures are in contact with the dynamic submarine power cable 11. The inner surface may comprise a plurality of grooves, with a groove being provided between adjacent pairs of radially inwards extending structures. For example, the radial spacing may be formed by the grooves between the radially inwards extending structures.

The radial spacing forms a longitudinal water channel between the bend stiffener 9 and the dynamic submarine power cable 11. The longitudinal water channel extends from the top end 9a to the lower end 9b of the bend stiffener 9 along the entire length of the dynamic submarine power cable 11 arranged in the bend stiffener 9.

The offshore structure tube 7 has an inner tube channel 7a which is in fluid communication with the longitudinal water channel of the bend stiffener 9. The longitudinal water channel opens into the inner tube channel 7a in a vertically upwards direction.

The offshore structure tube 7 has one or more through-openings 7b extending from the inner tube channel 7a through a wall 7c of the offshore structure tube 7. The inner tube channel 7a is thus in fluid communication with the exterior of the offshore structure tube 7.

As shown in FIG. 2, in use, water 13 enters the longitudinal water channel between the bend stiffener 9 and the dynamic submarine power cable 11 at the lower end 9b of the bend stiffener 9.

The water 13 is heated by the dynamic submarine power cable 11 because of the current flowing through the dynamic submarine power cable 11. This causes the water 13 to rise inside the bend stiffener 9 along the longitudinal water channel.

Water 13 flows through the entire bend stiffener 9 and as it leaves the bend stiffener 9 it rises further into the inner tube channel 7a of the offshore structure tube 7. As the water 13 reaches the one or more through-openings 7b, water 13 is passed through the one or more through-openings 7b, exiting the offshore structure tube 7. The water 13 thus circulates back into the body of water outside the bend stiffener 9 and the offshore structure tube 7, which are immersed in water. This process is continuously repeated and the dynamic submarine power cable 11 is thus water cooled by natural convection or alternatively by forced cooling.

FIG. 3 shows a close-up view of another realization of the offshore system 1 in a region of the bend stiffener 9' which is immersed in water.

The bend stiffener 9' is similar to the bend stiffener 9. The bend stiffener 9' however has one or more radial through-opening(s) 9d extending from the central channel 9c to an outer surface of the bend stiffener 9'. Each such radial through-opening 9d is arranged in a top region of the bend stiffener 9'. The bend stiffener 9' has a total axial length L which is the length of the bend stiffener 9' measured between the top end 9a and the lower end 9b, i.e., the distance between top end 9a and the lower end 9b. The one or more radial through-opening 9d is arranged at a distance d from the top end 9a, which distanced is at most ¼, ⅕ or 1/10 of the total axial length L. Thus d≤¼L, or d≤⅕L, or d≤1/10L measured from the top end 9a.

Water 13 flows through the bend stiffener 9' up to the radial through-opening 9d. As the water 13 reaches the radial through-opening 9d, water 13 is passed through the radial through-openings 9d, exiting the bend stiffener 9'. The water 13 thus circulates back into the body of water outside the bend stiffener 9' which is immersed in water. This process is continuously repeated and the dynamic submarine power cable 11 is thus water cooled by natural convection or alternatively by forced cooling.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. An offshore system comprising:

a dynamic submarine power cable, a bend stiffener having a lower end and a top end, the bend stiffener having a central channel extending from the lower end to the top end, the central channel receiving the dynamic submarine power cable with a radial spacing between an inner surface of the central channel and an outer surface of the dynamic submarine power cable along the length of the dynamic submarine power cable arranged in the bend stiffener, the radial spacing forming a longitudinal water channel between the bend stiffener and the dynamic submarine power cable, and an offshore structure tube connected to the bend stiffener, wherein:

A) the offshore structure tube has an inner tube channel in fluid communication with the longitudinal water channel, and wherein the offshore structure tube has a through-opening extending from the inner tube channel through a wall of the offshore structure tube to enable water flowing from the lower end through the bend stiffener to exit the offshore structure tube via the through-opening to provide water cooling of the dynamic submarine power cable in the bend stiffener, or B) the bend stiffener has a radial through-opening arranged within ¼ of a total axial length of the bend stiffener, defined by a distance between the lower end and the top end, from the top end to enable water flowing from the lower end through the bend stiffener to exit the bend stiffener via the radial through-opening to provide water cooling of the dynamic submarine power cable in the bend stiffener, wherein the longitudinal water channel extends from the top end to the lower end of the bend stiffener along the entire length of the dynamic submarine power cable arranged in the bend stiffener, wherein at an interface between the bend stiffener and the dynamic submarine power cable where the dynamic submarine power cable enters the lower end of the bend stiffener, the outer surface of the dynamic submarine power cable and an outer surface of the bend stiffener form outermost surfaces of the offshore system.

2. The offshore system as claimed in claim 1, wherein the offshore structure tube is an I-tube.

3. The offshore system as claimed in claim 2, wherein the through-opening or radial through-opening is arranged underwater.

4. The offshore system as claimed in claim 2, wherein the dynamic submarine power cable is a high voltage power cable rated for a voltage of at least 33 kV.

5. The offshore system as claimed in claim 2, wherein the dynamic submarine power cable extends inside the inner tube channel of the offshore structure tube.

6. The offshore system as claimed in claim 2, comprising an offshore floating structure, wherein the offshore structure tube forms part of the offshore floating structure.

7. The offshore system as claimed in claim 1, wherein the bend stiffener is a submerged bend stiffener.

8. The offshore system as claimed in claim 1, wherein the through-opening or radial through-opening is arranged underwater.

9. The offshore system as claimed in claim 1, wherein the dynamic submarine power cable is a high voltage power cable rated for a voltage of at least 33 kV.

10. The offshore system as claimed in claim 1, wherein the dynamic submarine power cable extends inside the inner tube channel of the offshore structure tube.

11. The offshore system as claimed in claim 1, comprising an offshore floating structure, wherein the offshore structure tube forms part of the offshore floating structure.

12. The offshore system as claimed in claim 11, wherein the offshore floating structure is one of a floating wind turbine, a floating substation, a floating hydrocarbon platform or a floating hydrocarbon vessel.

13. A method of cooling a dynamic submarine power cable of an offshore system having a dynamic submarine power cable, a bend stiffener having a lower end and a top end, the bend stiffener having a central channel extending from the lower end to the top end, the central channel receiving the dynamic submarine power cable with a radial spacing between an inner surface of the central channel and an outer surface of the dynamic submarine power cable along the length of the dynamic submarine power cable arranged in the bend stiffener, the radial spacing forming a longitudinal water channel between the bend stiffener and the dynamic submarine power cable, and an offshore structure tube connected to the bend stiffener, wherein the offshore structure tube has an inner tube channel in fluid communication with the longitudinal water channel, and wherein the offshore structure tube has a through-opening extending from the inner tube channel through a wall of the offshore structure tube to enable water flowing from the lower end through the bend stiffener to exit the offshore structure tube via the through-opening to provide water cooling of the dynamic submarine power cable in the bend stiffener or wherein the bend stiffener has a radial through-opening arranged within ¼ of a total axial length of the bend stiffener, defined by a distance between the lower end and the top end, from the top end to enable water flowing from the lower end through the bend stiffener to exit the bend stiffener via the radial through-opening to provide water cooling of the dynamic submarine power cable in the bend stiffener, the method comprising:

providing the bend stiffener such that the lower end is submerged in seawater, causing seawater to enter the longitudinal water channel, wherein the longitudinal water channel extends from the top end to the lower end of the bend stiffener along the entire length of the dynamic submarine power cable arranged in the bend stiffener, wherein at an interface between the bend stiffener and the dynamic submarine power cable where the dynamic submarine power cable enters the lower end of the bend stiffener, the outer surface of the dynamic submarine power cable and an outer surface of the bend stiffener form outermost surfaces of the offshore system.

14. The method as claimed in claim 13, wherein the seawater flows along the longitudinal water channel and exits the through-opening or radial through-opening by natural convection.

15. The method as claimed in claim 13, wherein the through-opening or radial through-opening is arranged underwater.

\* \* \* \* \*